United States Patent
Zhang et al.

(10) Patent No.: US 8,098,611 B2
(45) Date of Patent: Jan. 17, 2012

(54) RELAY CODED MULTI-USER COOPERATIVE COMMUNICATIONS FOR UPLINK 4G WIRELESS NETWORKS

(75) Inventors: Jinyun Zhang, Cambridge, MA (US); Lei Cao, Oxford, MS (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 465 days.

(21) Appl. No.: 12/414,329

(22) Filed: Mar. 30, 2009

(65) Prior Publication Data

US 2010/0246474 A1    Sep. 30, 2010

(51) Int. Cl.
*H04B 7/14* (2006.01)
*H04J 1/10* (2006.01)
*H04J 3/08* (2006.01)
*H03M 13/00* (2006.01)

(52) U.S. Cl. ......... 370/315; 370/476; 370/479; 714/759

(58) Field of Classification Search .................. None
See application file for complete search history.

(56) References Cited

U.S. PATENT DOCUMENTS

| | | | |
|---|---|---|---|
| 2007/0124656 A1* | 5/2007 | Pisek et al. ........... | 714/794 |
| 2008/0075278 A1* | 3/2008 | Gaubatz et al. ........ | 380/30 |
| 2009/0259915 A1* | 10/2009 | Livshitz et al. ....... | 714/758 |
| 2010/0150173 A1* | 6/2010 | Yu et al. ............. | 370/474 |
| 2011/0044379 A1* | 2/2011 | Lilleberg et al. ...... | 375/211 |

OTHER PUBLICATIONS

Boutillon et al, Iterative Decoding of Concatenated Convolutional Codes: Implementation Issues, Jun. 2007, IEEE.*

* cited by examiner

*Primary Examiner* — Andrew Chriss
(74) *Attorney, Agent, or Firm* — Dirk Brinkman; Gene Vinokur

(57) ABSTRACT

Source nodes in an International Mobile Telecommunications (IMT)-advanced 4G network transmit data on uplink channels to a relay node and a BS using a channel code. The relay node decodes independently the data received from each source node, and applies network coding to data correctly decoded, and transmits the encoded data to the BS. The BS decodes the encoded data transmitted by the sources nodes and the relay nodes cooperatively via a turbo decoding process. The data from each source node are decoded by soft-input soft-output single user decoders and are decoded, together with the data from the relay node, by a soft-input soft-output multi-user decoder.

13 Claims, 7 Drawing Sheets

311 — $A_{K \times K} = \begin{bmatrix} 1 & 0 & 1 & \cdots & 1 & 1 & 0 \\ 0 & 1 & 1 & \cdots & 1 & \cdots & 1 \\ \vdots & \vdots & \vdots & & \vdots & \ddots & \vdots \\ 1 & 0 & \cdots & 0 & 1 & 1 & 1 \\ 1 & \cdots & 1 & 0 & 1 & \cdots & 1 \end{bmatrix}$ where K is even 312 — $A_{K \times K} = \begin{bmatrix} 1 & 0 & 1 & \cdots & 1 & 1 & 1 \\ 0 & 1 & 1 & \cdots & 1 & \cdots & 1 \\ \vdots & \vdots & \vdots & & \vdots & \ddots & \vdots \\ 1 & 0 & \cdots & 0 & 1 & 1 & 1 \\ 1 & \cdots & 1 & 0 & 1 & \cdots & 1 \end{bmatrix}$ where K is odd 313 — Special case K=2 $A_{2 \times 2} = \begin{bmatrix} 1 & 1 \\ 0 & 1 \end{bmatrix}$

RELAY CODED MULTI-USER COOPERATIVE COMMUNICATIONS FOR UPLINK 4G WIRELESS NETWORKS

FIELD OF THE INVENTION

This invention relates generally wireless relay networks, and more particularly to uplink in 4G wireless networks communication networks including the IMT-Advanced networks.

BACKGROUND OF THE INVENTION

IMT-Advanced 4G Wireless Communication Networks

International Mobile Telecommunications (IMT)-advanced networks are the latest effort in International Telecommunication Union (ITU)-R for 4G wireless communications. One goal is to provide an uplink peak spectrum efficiency of 15 bits per second (bps) per Hz, and throughput as high as possible in the edge area of a network cell, given a reasonable network complexity. To achieve this goal, various enabling technologies have been described. A current consensus is to use relay stations (RS) for the improvement of link performance.

The IEEE802.16j standard has also adopted RS. This invention is particularly related to the uplink of 4G wireless communication networks where the RS is used.

Relay and Network Encoding

Relay-based communications facilitates the cooperative decoding at a receiver to improve an overall link performance. There are in general two types of relay-based communication: amplifying and forwarding (AF) and decoding and forwarding (DF). The invention uses the DF. In network encoding, the network is modeled as a graph, where edges represent channels from a transmitter to a receiver. Using the max-flow min-cut theorem, it is possible to calculate the maximum amount of information flow that can be transmitted from a source to a specific receiver. Network coding can enable all intended receivers to get the maximum network information flow from the source simultaneously. Network encoding and channel coding both use operations in finite fields.

Cooperative Communications

One purpose of cooperative communication is to provide multiple links or channels for the communication between a source and destination node so that a virtual multiple-input multiple-out (MIMO) communications is provided for encoding and diversity.

Turbo Decoding of Network Encoding and Channel Encoding

In wireless communications, the data transmitted from the source to the destination are usually channel encoded to reduce the effect of channel noise. Channel encoding uses a forward error correction (FEC) code, and often with bit interleaving. The channel code is used to protect the transmitted data in the presence of noise. After data from one source node is received at the destination, the decoding of the received data to recover the source information can be carried out independent of the decoding of data from other source nodes. In the case of network coding, because all data are network encoded at the RS, decoded information of current data can be used to improve the decoding of other data. As a result, a turbo decoding process can be built up so that the decoding alternates between the channel decoding (single-user decoders) and network decoding (multi-user decoder).

SUMMARY OF THE INVENTION

The embodiments of this invention provide a multi-user, cooperative communication network and method which is related to transmitting data from multiple source nodes to a destination node with the assistance of relay nodes.

This invention is specifically appropriate for the up-link IMT-advanced 4G wireless communication networks. One embodiment describes the encoding at the relay node, and another the cooperative decoding process at the destination node.

Source nodes or mobile station (MS) concurrently transmit data using different wireless channels. The data can be received at a relay node and a destination node or base station (BS). The received data can be corrupted by channel fading and noise. The case where the destination is unable to receive or recover all of the data, due to a large distance or noisy channel condition, is also described.

After the relay node receives the data from multiple sources, the relay demodulates and decodes the data for each source because channel encoding is applied by each source.

If the data are correctly decoded, which can be determined by a cyclic redundancy check (CRC) codes, then the data are network encoded using a matrix, with an appropriate size, which is invertible over a binary finite field. The encoding process does not alter the size of the data before and after encoding due to features of a full rank of the matrix.

Then, the encoded data are modulated and relayed to the destination. The steps include:

Demodulating and decoding data of individual source nodes;

Selecting a number of sources for cooperation;

Using an invertible matrix over a finite field for the network encoding data of the multiple sources; and Transmitting the encoded data to the destination.

At the destination, two data sets can be received. One data set is transmitted by the sources using channel coding, and received directly by the destination, although corruption is possible. The other data set is transmitted by the relay using network encoding. This data can also be corrupted. The destination applies iterative decoding to the received data sets, alternating between a number of single-user decoders and a multi-user decoder.

Components

Soft-In Soft-Out Decoding

For the soft-in soft-out decoding, the destination receives data and a priori information of symbols in the transmitted data. The decoder generates log-likelihood ratio (LLR) of the received symbols. This decoding is also called maximum a posteriori probability (MAP) decoding.

Information-Exchange-Based Iterative Decoding

Iterative decoding alternates between a multi-user decoder, which corresponds to the network encoder, a set of single-user decoders, which correspond to channel encoders.

The embodiments of the invention provide a novel network encoding matrices, which are invertible over a binary finite field. As a result, self-recovery of the original data transmitted from each source is possible based on the encoded data in a communication network where direct links between sources and the destination are not available, or too noisy.

The cooperative communication according to embodiments of the invention has the following advantages. Cooperation is considered concurrently for multiple sources using the network encoding in the relay. Therefore, in this invention, the decoding results of data transmitted from one source node can be exploited for the detection and decoding of data transmitted from other source nodes.

Because the data from multiple sources are also decoded at the relay, and then network encoded before the encoded data are transmitted to the destination, the decoding of the data for multiple sources is also enabled at the destination. As a result, there are two types of encoding and decoding in this invention: channel encoding for single sources, and network encoding for multiple sources.

The data recovery process at the destination is to find an estimate of the source data of the multiple sources so that the encoded data, after both types of encoding processes, have the minimum distance from data received at the destination. This maximum-likelihood decoding is known as a NP problem. In this invention, a near optimal turbo decoding strategy is provided at the destination to iteratively decode the received data.

Network encoding makes it possible to achieve a data transmission rate approaching the capacity limit. One embodiment applies an exclusively OR (XOR) to data received from two mobile stations (MS) before being relaying the data to the BS. This way, the BS can jointly decode the data from the MS and RS with a lower bit error rate (BER) than if the data were decoded independently.

BRIEF DESCRIPTION OF THE DRAWINGS

FIG. 3B is a block diagram of invertible matrices over a binary finite field according to embodiments of the invention;

DETAILED DESCRIPTION OF THE PREFERRED EMBODIMENT

Figure 1:
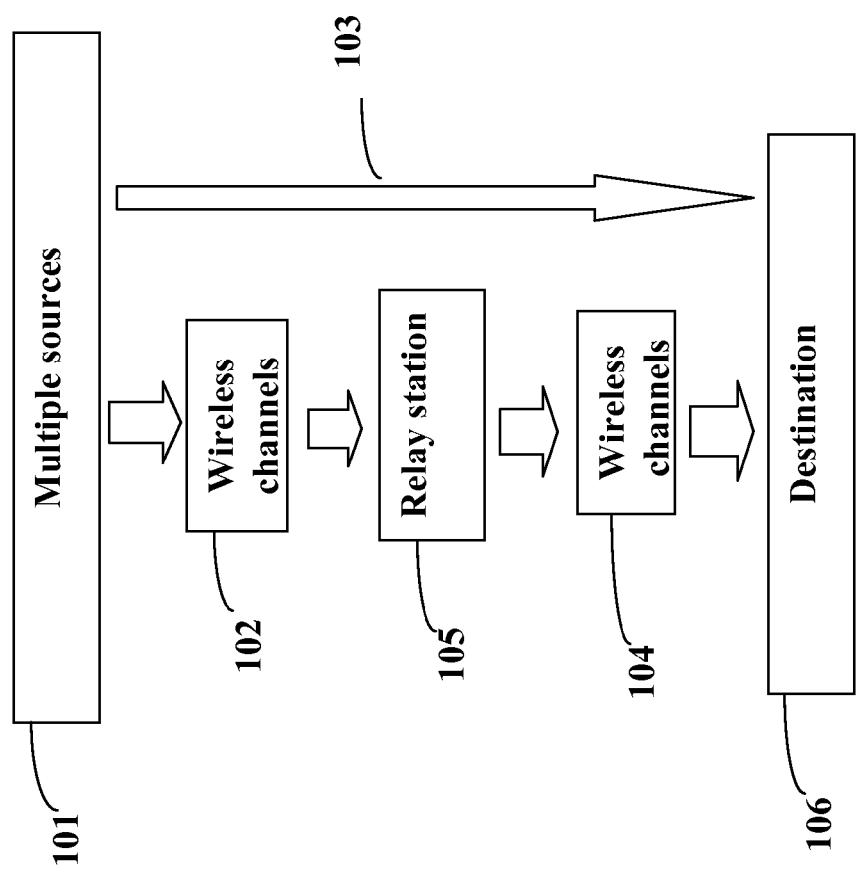
FIG. 1 is a flow diagram of signaling in a wireless relay network of multiple source nodes communicating with a destination node according to embodiments of the invention.

FIG. 1 shows the general signaling in a wireless network of source nodes 101, relay nodes 103 and a destination node 106 according to embodiments of our invention via channels (links) 102, 103 and 104. The source concurrently transmits data to destination, either directly, indirectly via the relay nodes. As defined herein, source nodes, users and mobile stations (MS) are equivalent, destination node, base stations (BS) are equivalent, and links and channels are equivalent.

Figure 2:
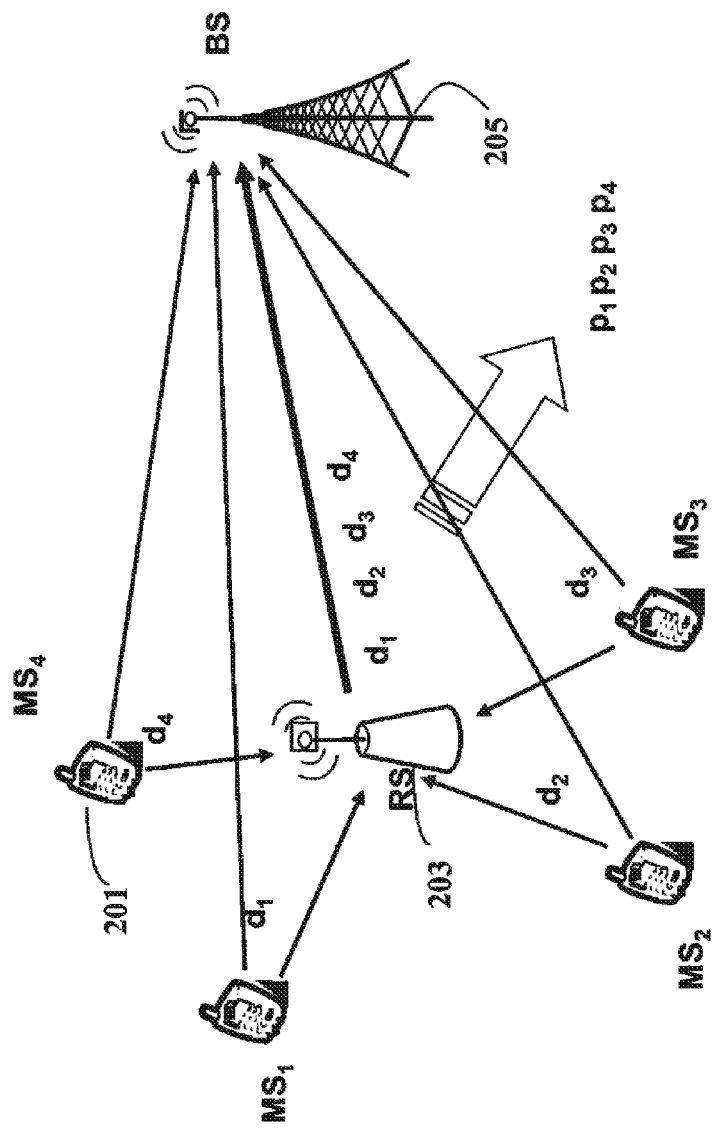
FIG. 2 is a schematic of example uplinks in an IMT-Advanced networks with four cooperating sources according to embodiments of the invention.

FIG. 2 shows an example network of uplinks in an International Mobile Telecommunications (IMT)-advanced wireless communication network wherein a relay 203 is used to assistant with the communication. In this example, there are four MSs 201 transmitting signals to the BS 205 concurrently. The MSs transmit symbols "a", "b", "c", "d", respectively, at a specific time instant. Both the BS and the RS can receive the transmission.

The RS decodes the symbols, and uses network encoding to convert correctly decoded symbols "a", "b" "c" "d" to symbols "$p_1$," "$p_2$," "$p_3$," "$p_4$," which are then transmitted to the BS.

The correct decoding of a specific MS is not required at RS. As long as the RS has correctly decoded data from a number of MS, the data can be switched to a mode of cooperative communication. A transfer matrix, of an appropriate size, is applied to the data from these MSs. If data from one MS are incorrectly decoded by the RS, then a different operation can be followed for this MS.

The indices of the network encoded MSs are included in the head of a frame carrying the data. The number of MS that are network encoded can be different from frame to frame based on the number of MSs that are communicating with the BS, and the number of MS whose data are correctly decoded at the RS, detected by cyclic redundancy check (CRC) codes.

Figure 3A:
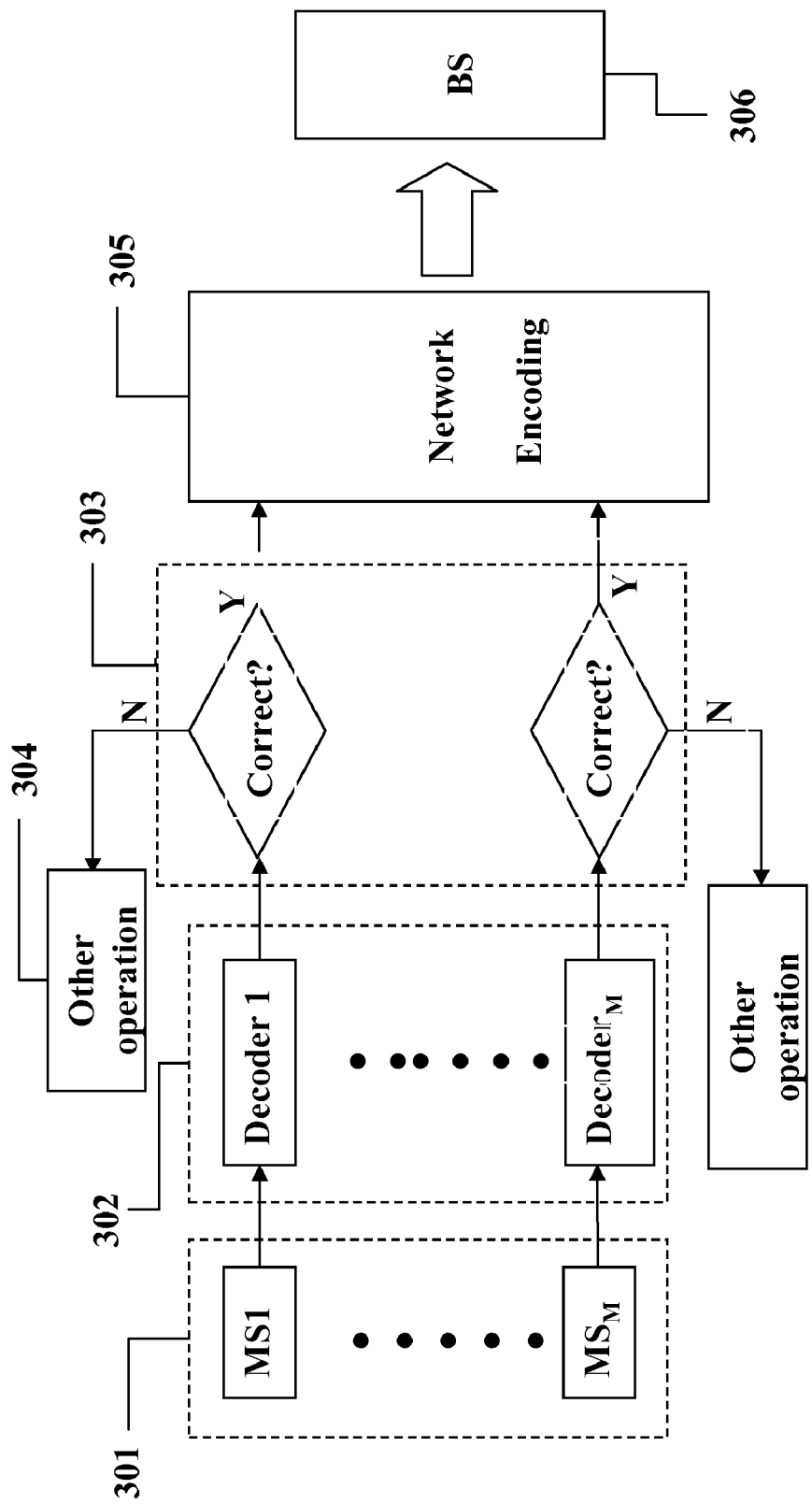
FIG. 3A is a flow diagram of operation at a relay node according to embodiments of the invention.

FIG. 3A shows the method steps performed at the RS. The data transmitted by the MS 301 are decoded 302 independently. Each decoding is individually checked 303 for correctness. If correct, then the data are network encoded 305 and cooperatively transmitted to the BS 306. Otherwise, some other operations 304 can be applied to the incorrectly decoded data.

For example, a retransmission strategy can be initiated in 304 so that the data that are incorrectly decoded in a current time slot can be correctly decoded and cooperated with data from other MSs in a later time slot.

Alternatively, the RS can switch from the DF mode to the AF mode for this specific MS. As a result, this specific MS does not participate in the cooperative communications with other MSs, but still retains some degree of diversity due to the existence of multiple links including the direct link between the MS and the BS, and the link between the RS and the BS.

FIG. 3B shows the transfer matrices 311, 312 and 313 according to embodiments of the invention, respectively for when K is even, odd or 2. Because the different types of modulation can always be represented at the bit level, we describe the following by assuming a binary transmission, i.e., binary phase shift keying (BPSK) for each MS.

The number of MS for cooperative communications can change from frame to frame. For one frame there are "K" MSs, where "K" can be even 311 or odd 312. The data from the "K" MSs, i.e., a column vector "D" with "K" symbols at a specific time index, is network encoded using a transfer matrix "A", and generate a column vector "P" to be transmitted from the RS to the BS. That is, P=AD.

Invertible Matrix

The matrix is designed based on two objectives.

First, self-recovery capability must be guaranteed, i.e., the column vector "D" can be correctly decoded even though only "P" is available. This is required in some cases where the direct links between the MSs and the BS are too severe to carry data. Therefore, the matrix "A" is a full rank, non-singular square matrix, i.e., an invertible matrix over a finite field. In linear algebra, an n-by-n square matrix A is invertible, or non-singular if there exists an n-by-n matrix B such that $AB=BA=I_n$, where $I_n$ denotes the n-by-n identity matrix and the multiplication used is conventional. If this is the case, then the matrix B is uniquely determined by the matrix A, and is called the inverse of A, or $A^{-1}$.

Second, information of one symbol is spread over the encoded symbols so that soft information can be extracted later at the BS for the turbo decoding. The size of the matrix "A" is arbitrary, and the case when "K"=2 is described specifically in FIG. 3. B. Permutation of rows of the matrix gives the equivalent result.

Channel encoding and decoding is used for the data of each MS to deal with errors. As a result, the data transmitted each MS also includes parity information. Because any linear channel code can be converted to a network code, we describe the data 401 in FIG. 4 from each MS as "$x_i$," i.e., source information, and "$x_i^p$," i.e., parity information, i=1, ..., K.

If the RS has correctly decoded the data, then the RS encodes the data 401 from "K" MS via network encoding.

Figure 4:
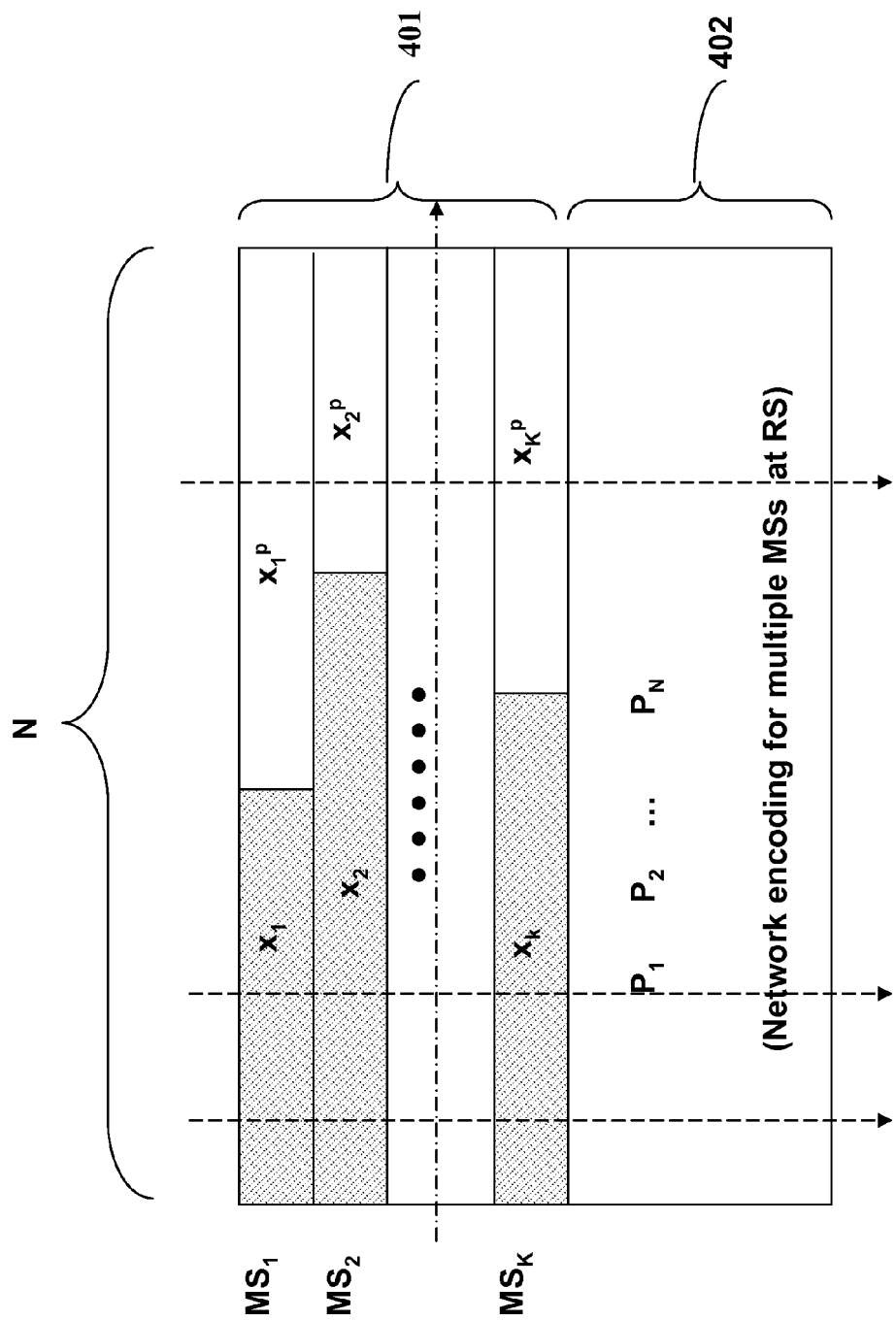
FIG. 4 is a block diagram of source and parity data according to embodiments of the invention.

The network encoded data are denoted as 402, where N is the number of symbols in a frame. In addition, when all MSs are using the identical channel code, data 402 are in the identical coding space of the channel code. Therefore, data 402 can also be channel decoded in the horizontal direction as shown in FIG. 4.

BS Decoder

Figure 5:
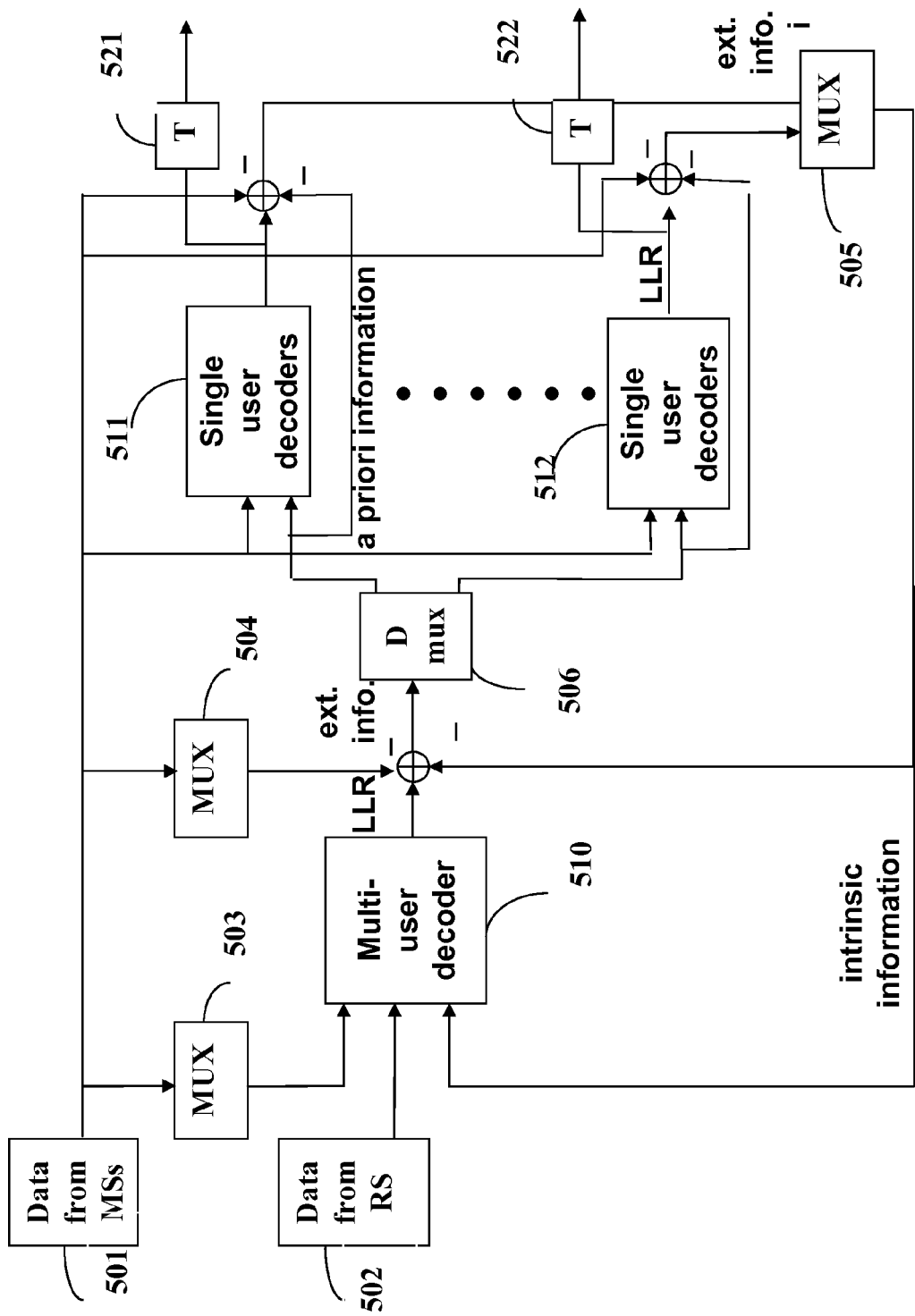
FIG. 5 is a block diagram of a turbo decoder according to embodiments of the invention.

FIG. 5 shows the decoder at the BS. The destination (BS) receives signals from both the MSs and the RS, which can be corrupted by channel fading and noise. The objective of the BS is to recover the source data transmitted by each MS, i.e., "$x_i$", i=1, . . . , K, in FIG. 4.

The optimal solution uses Maximum Likelihood (ML) decoding, which gives an estimate X* based on which the data Y* generated after both channel encoding and network encoding has the minimum distance from the entire received signal at the BS. The turbo decoding structure shown in FIG. 5 provides the near optimal solution of this problem.

Data 501 is received directly from the MS and data 502 is received from the RS. The data can be corrupted due to channel fading and noise.

The decoder includes multiplexers 503-505, and demultiplexer 506. Multiplexing is used to combine data received from the set of source and the relay for a multi-user decoder 510. Demultiplexing is used to separate the decoded data from the multi-user decoder for a set of single-user decoders 511-512, one for each user. Each of the decoders 511-512 is a soft-in-soft-out decoder, which implements a maximum a posteriori probability decoding, or equivalent.

Threshold detectors 521-522 output 1 when the input is larger than 0, and −1 otherwise.

Figure 6:
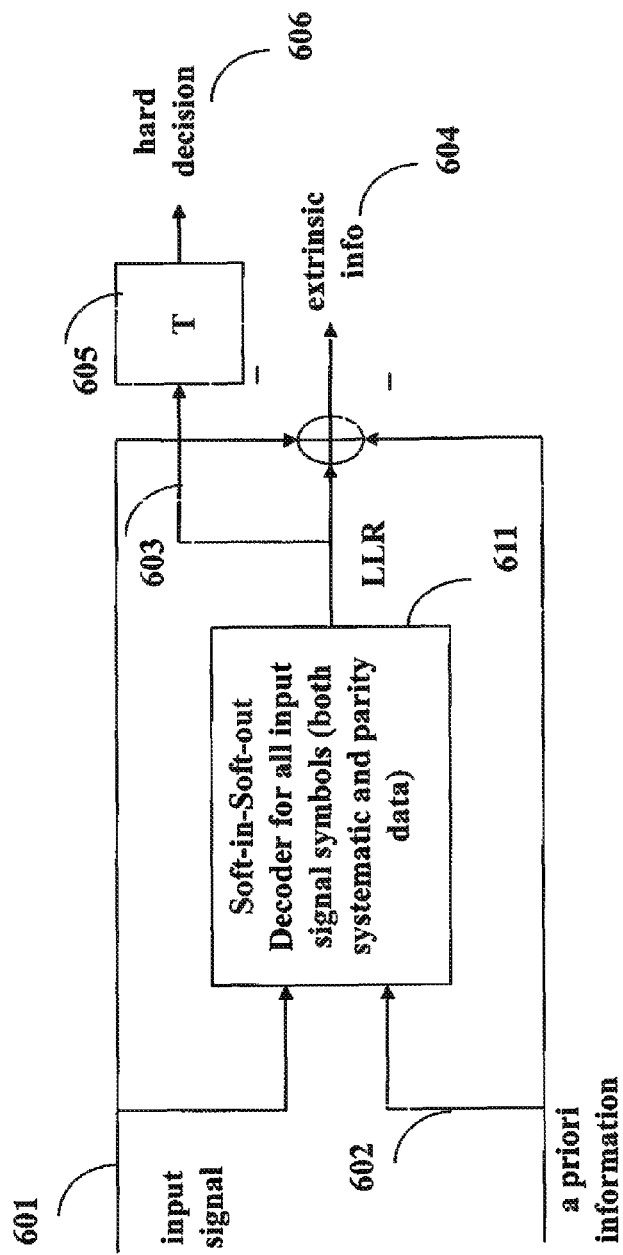
FIG. 6 is a block diagram of a soft-in soft-out decoder according to embodiments of the invention.

FIG. 6 shows a soft-in-soft-out decoder 611 that has two inputs 601-602. One input is the received signal from the channel output at the BS, and the other is a priori information of the symbols that are extracted from the multi-user decoder. The input symbols are the channel corrupted version of the encoded data. Each symbol has a priori information. The output log-likelihood ratio (LLR) is generated for each input symbol. As a result, both source symbols and parity symbols have the a priori information before decoding, and the LLR and extrinsic information after decoding.

When the MS in cooperation use identical channel code, FIG. 6 also shows the structure of the multi-user decoder. When the MS in cooperation use different channel codes, FIG. 6 shows the structure of the multi-user decoder except that the a priori information 602, LLR 603 and extrinsic information 604 are only available for the source symbols, but not for the network coded symbol, in the network coding The output 603 of this decoder includes a hard decision 606, which is a LLR of decoded symbols. The LLR value less the input and a priori information 602 is called extrinsic information 604, which is the new information generated by the decoder. The extrinsic information is passed between the single-user decoders and multi-user decoder, after de-multiplexing or multiplexing as the updated a priori information to form a loop for turbo decoding. Finally, threshold detection with respect to value "0" is the hard decision of decoded symbols.

EFFECT OF THE INVENTION

In an example network, four MSs perform cooperative communications. For the example, recursive systematic convolutional (RSC) code with generator $(7,5)_{oct}$ and rate ½ is used as the channel encode for each MS. Each MS-BS link experiences different block fading, which is equivalent to using different Gaussian channels. Operation at the RS is a 4×4 matrix, which generates coded data equivalent to the parity information of a (8,4,4) extended Hamming code.

When channel coding is not considered, for $SNR_d$=5 dB of the link between the MS and the BS, there is a 2 dB improvement at BER=$10^{-4}$ for various SNR of links between the RS and the BS, compared with maximum ratio combining (MRC) diversity. This results shows that when moderate direct links between MSs and BS exist, large gain can be obtained with the network encoding at the RS, even without the iterative decoding between channel encoding and network encoding.

When channel coding is consider, for $SNR_d$=1 dB of the link between the MS and the BS, there is about 3 dB improvement at BER=$10^{-4}$ for various SNR of links between the RS and the BS, compared with MRC diversity. This results shows significant gain can be obtained with iterative decoding in the invention.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A wireless International Mobile Telecommunications (IMT)-advanced 4G network including a set of source nodes, wherein the set of source nodes transmit data on uplink channels using a channel code, comprising:
   a relay node comprising:
      a receiver;
      a set of decoders, there being one decoder for each source node transmitting the data, and wherein the data are channel encoded, and wherein each decoder determines whether the data received from the source node are decoded correctly;
      a network encoder configured to encode the data correctly decoded, wherein each network encoder uses an invertible matrix over a binary finite field to encode the correctly decoded data; and
      a transmitter configured to transmit the network encoded data.

2. The network of claim 1, further comprising:
   a destination node comprising:
      a receiver;
      a multiplexer configured to combine the channel encode data transmitted by the set of sources and the network encoded data transmitted by the relay
      a multi-user decoder configured to decode the network encoded data;
      a demultiplexer configured to separate the combined data according to each source to produce decode data for each source;
      a set of soft-input soft-output decoders, there being one soft-input soft-output for each separate decoded data; and
      a threshold detector, for each soft-input soft-output decoder, configured to produce a hard decision for each soft-input soft-output decoder.

3. The network of claim 2, wherein each soft-input soft-output decoder is a single-user decoder that produces a priori information for the multi-user decoder.

4. The network of claim 3, wherein each soft-input soft-output single user decoder receives a priori information from the multi-user decoder, and wherein the a priori information is subtracted from a log-likelihood ratio to produce extrinsic information to act as the a priori information for the multi-user decoder.

5. The network of claim 2, wherein the soft-input soft-output decoder is a multi-user decoder that produces a priori information for the single-user decoders.

6. The network of claim 5, wherein the soft-input soft-output multi-user decoder receives a priori information from the single user decoders, and wherein the priori information is subtracted from a generated log-likelihood ratio to produce extrinsic information to act as the a priori information for the single-user decoders.

7. The network of claim 2, wherein the soft-in soft-out multi-user decoding and the soft-input soft-output single-user decoding alternate iteratively with information exchange.

8. The network of claim 7, wherein the extrinsic information is extracted from the received data for systematic and parity data using a priori information.

9. The network of claim 2, wherein when cooperative source nodes have an identical channel code, and the data are channel decoded with the same soft-in soft-out single user decoder after network encoding.

10. The network of claim 1, wherein the set of source nodes transmit concurrently, using channel codes.

11. The network of claim 1, wherein data from each source node are channel decoded and a correctness of the decoding is determined.

12. The network of claim 1, wherein the source nodes use an identical channel code and the data are network encoded at the relay node for cooperation.

13. The network of claim 1, wherein the source nodes use different channel codes and the data are network encoded at the relay node for cooperation.

* * * * *